United States Patent [19]
Kiest, Jr.

[11] Patent Number: 6,039,079
[45] Date of Patent: Mar. 21, 2000

[54] APPARATUS AND METHOD FOR REPAIRING THE JUNCTION OF A SEWER MAIN LINE AND LATERAL PIPE

[75] Inventor: Larry W. Kiest, Jr., Ottawa, Ill.

[73] Assignee: LMK Enterprises, Inc., Ottawa, Ill.

[21] Appl. No.: 09/118,048

[22] Filed: Jul. 17, 1998

[51] Int. Cl.[7] ........................................... F16L 55/16
[52] U.S. Cl. .............................. 138/98; 138/97; 264/269; 264/516; 156/287
[58] Field of Search ..................... 138/98, 97; 264/269, 264/267, 516; 156/94, 287, 294, 574; 405/150.1

[56] References Cited

U.S. PATENT DOCUMENTS

| | | | |
|---|---|---|---|
| 5,044,405 | 9/1991 | Driver et al. | 138/98 |
| 5,049,003 | 9/1991 | Barton | 138/97 X |
| 5,167,258 | 12/1992 | Rice | 138/98 |
| 5,199,463 | 4/1993 | Lippiatt | 138/98 |
| 5,329,063 | 7/1994 | Endoh | 138/98 |
| 5,393,481 | 2/1995 | Wood | 264/516 |
| 5,439,033 | 8/1995 | Kamiyama et al. | 138/98 |
| 5,454,401 | 10/1995 | Kamiyama et al. | 138/98 |
| 5,566,719 | 10/1996 | Kamiyama et al. | 138/98 |
| 5,598,873 | 2/1997 | Kamiyama et al. | 138/98 |
| 5,624,629 | 4/1997 | Wood | 264/516 |
| 5,692,543 | 12/1997 | Wood | 138/98 |
| 5,927,341 | 7/1999 | Taylor | 138/98 |

FOREIGN PATENT DOCUMENTS 0 518 521 A3   12/1992   European Pat. Off. .

*Primary Examiner*—Patrick Brinson
*Attorney, Agent, or Firm*—Zarley, McKee, Thomte, Voorhees & Sease

[57] ABSTRACT

An apparatus and method for repairing the junction of a sewer main line and a lateral pipe includes a generally T-shaped flexible translucent urethane inflatable bladder having a main line portion and a lateral portion. The lateral portion is inverted through the main line portion and extends out one end thereof. A liner assembly of resin absorbent material is formed, with a tubular lateral liner connected to a flat sheet main liner, at a central opening in the flat sheet liner. Each liner is coated with a polymer coating, for an airtight seal, and a polymer tape is welded to the polymer coating on the lateral liner and the junction of the lateral liner and flat sheet, to form airtight seals. The liner assembly is then installed in the bladder assembly, by threading the lateral liner into the lateral bladder until the flat sheet contacts the main line bladder. The lateral liner is then impregnated with uncured resin and the liner/bladder assembly is installed on launcher. The flat sheet liner is also impregnated with uncured resin, and the launcher is then inserted in a sewer main line and aligned with a lateral pipe to be repaired. The lateral bladder is inflated to revert the bladder upwardly into the lateral pipe forcing the liner assembly into contact with the lateral pipe, the main line sewer pipe, and the junction thereof. Once the resin is cured, the bladder assembly and launcher are removed from the sewer pipe.

13 Claims, 8 Drawing Sheets

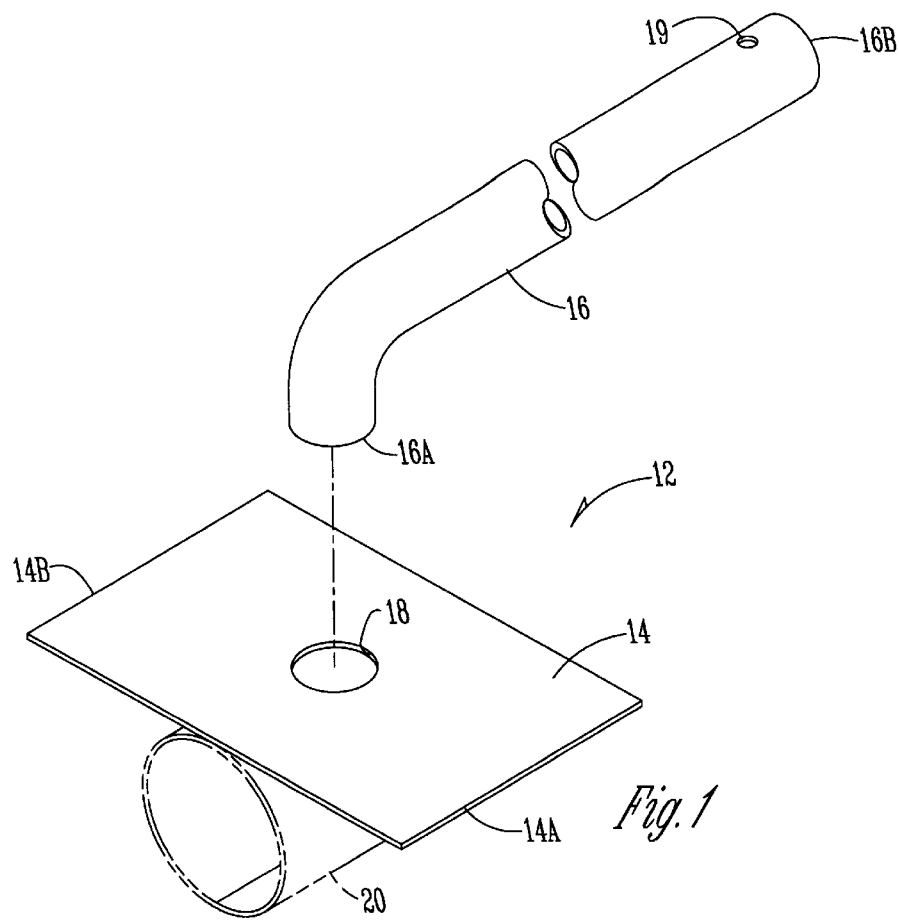
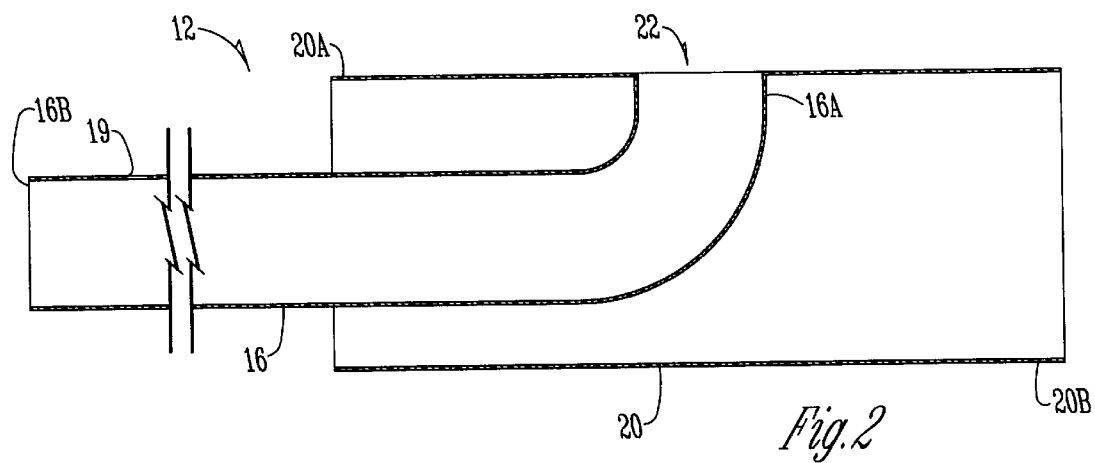

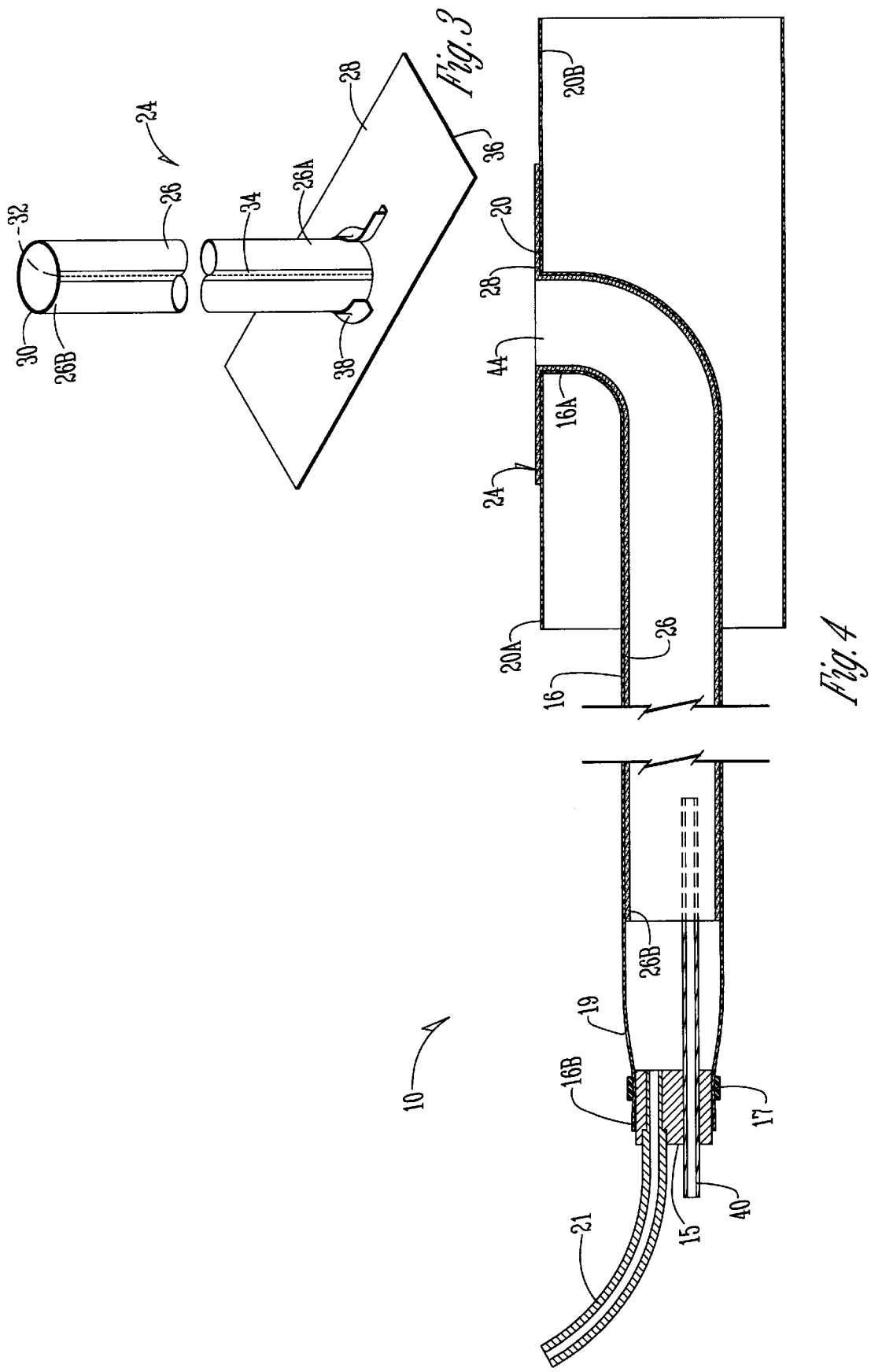

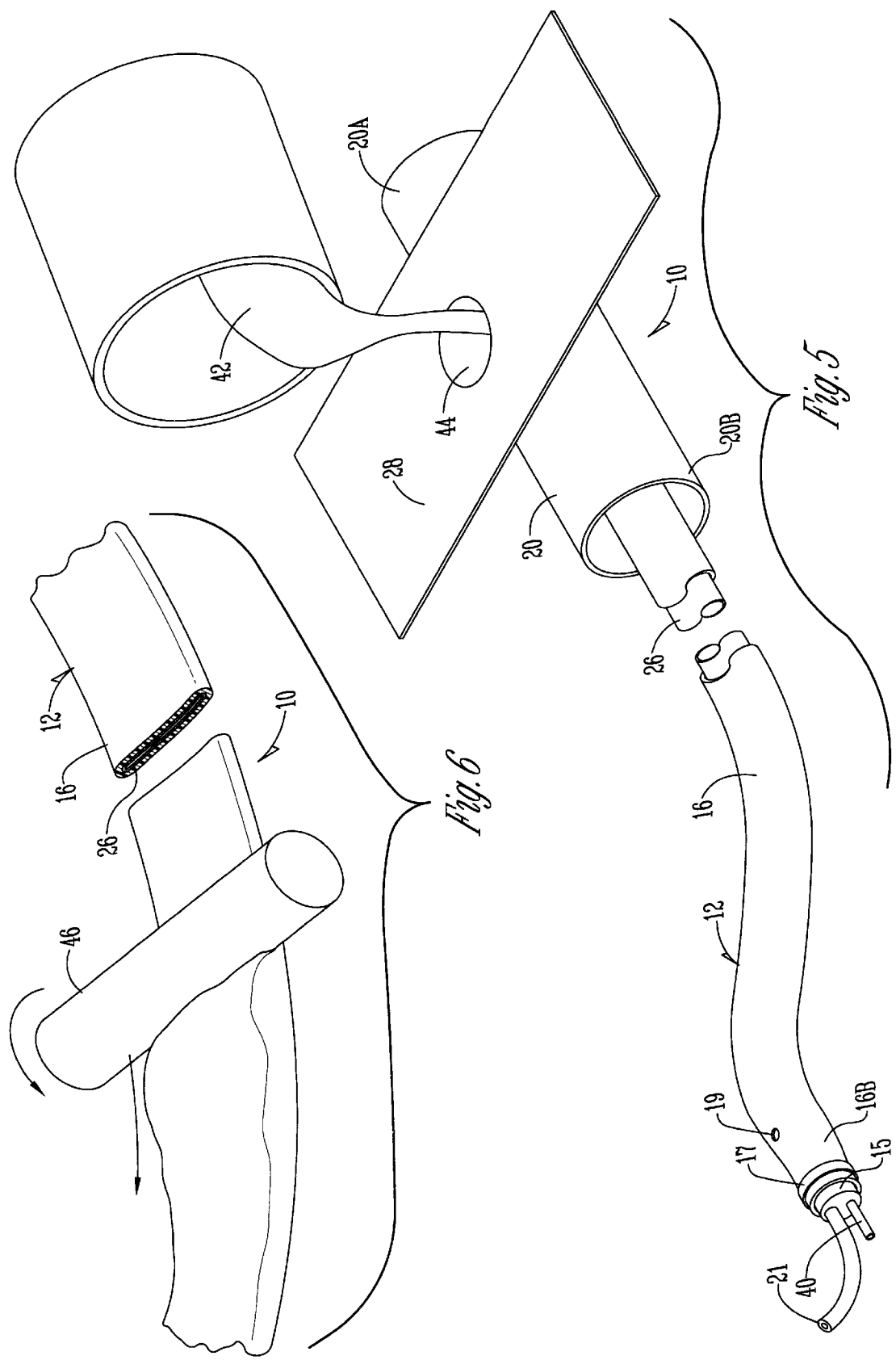

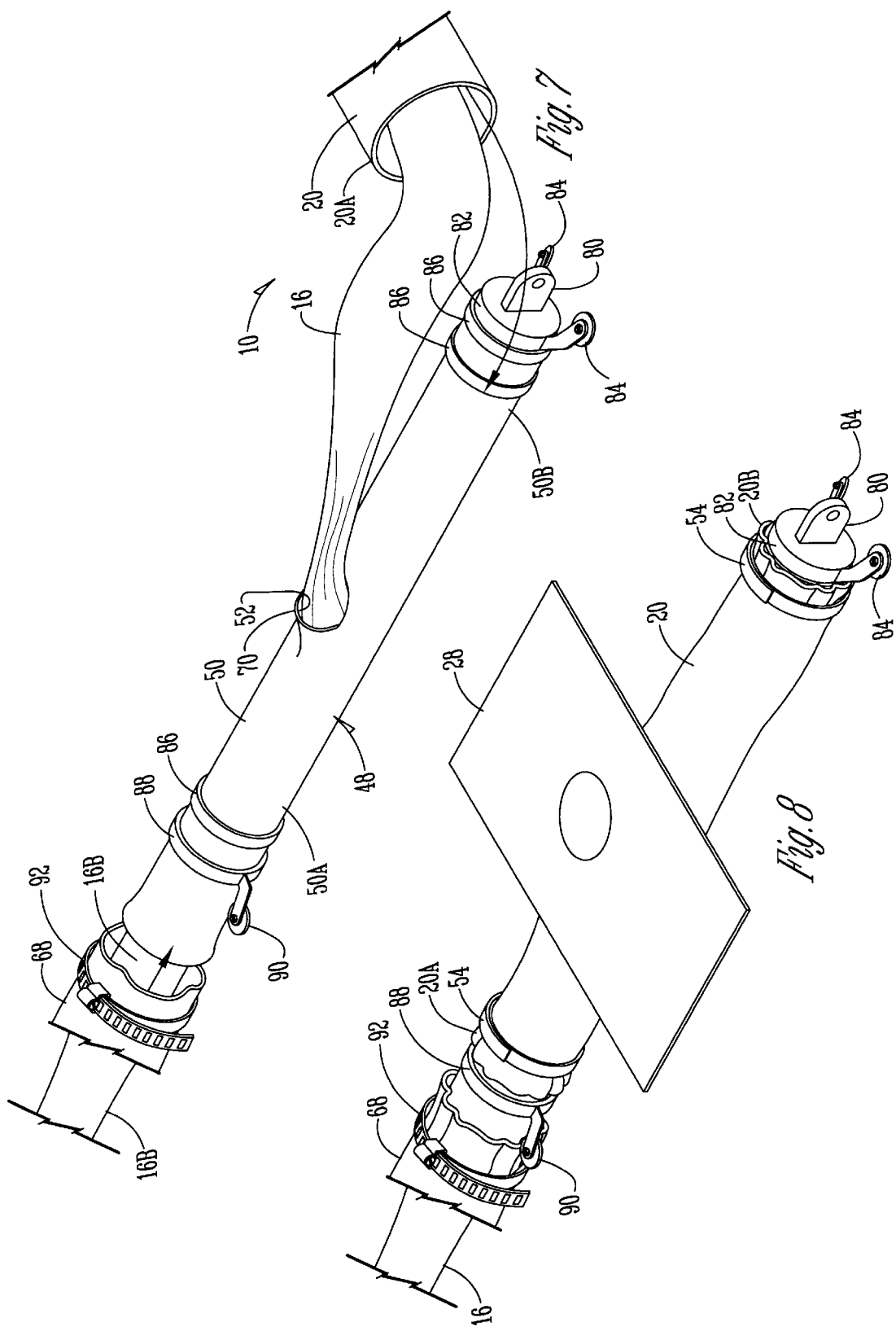

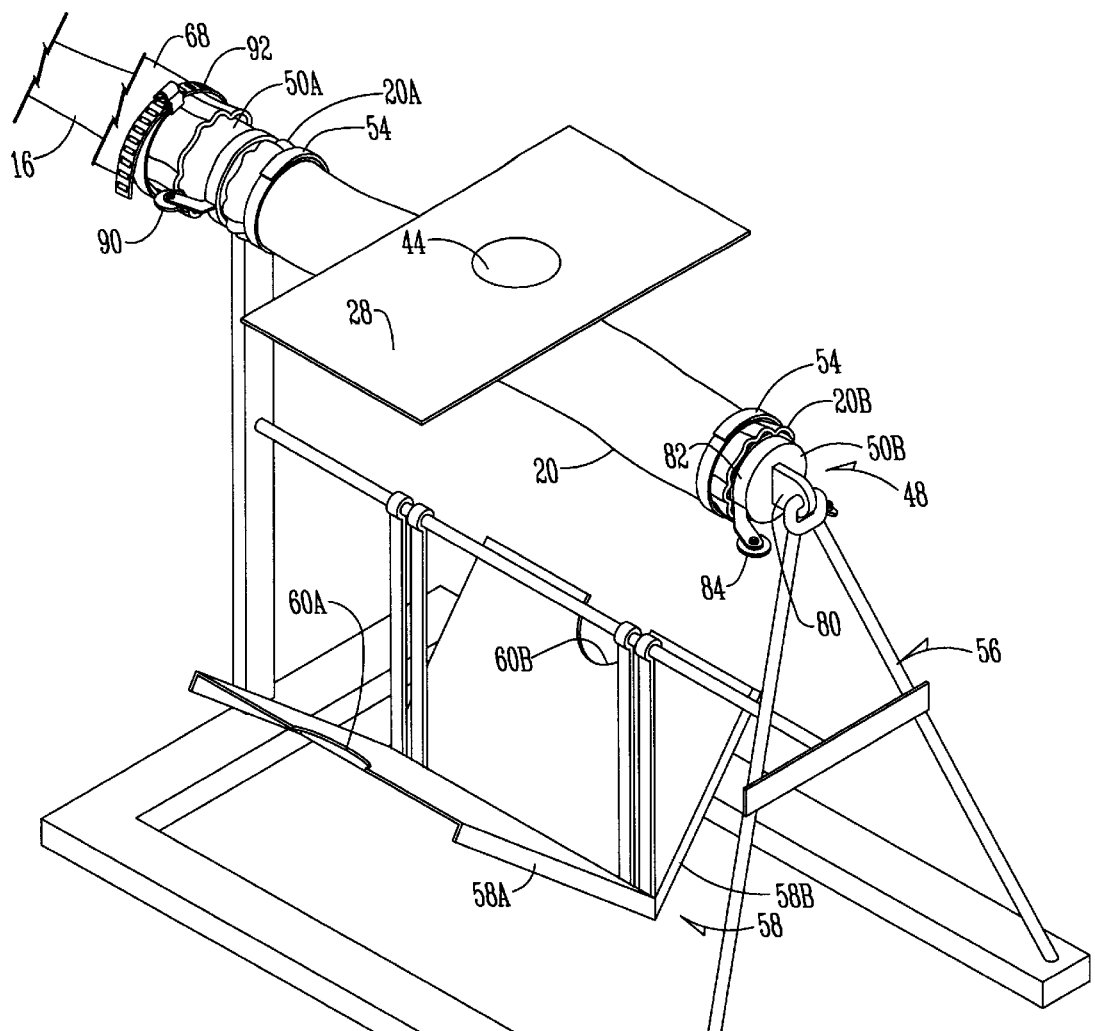
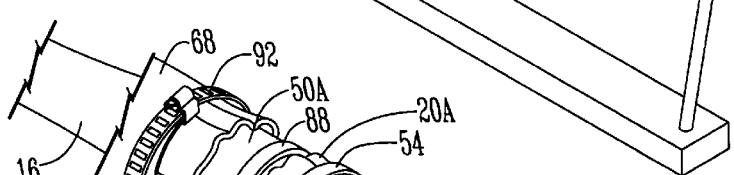
Fig. 10
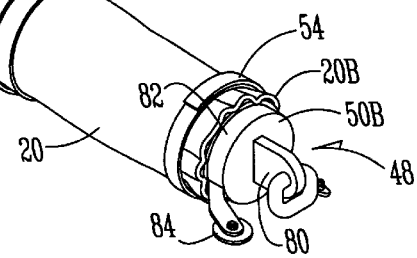
Fig. 11

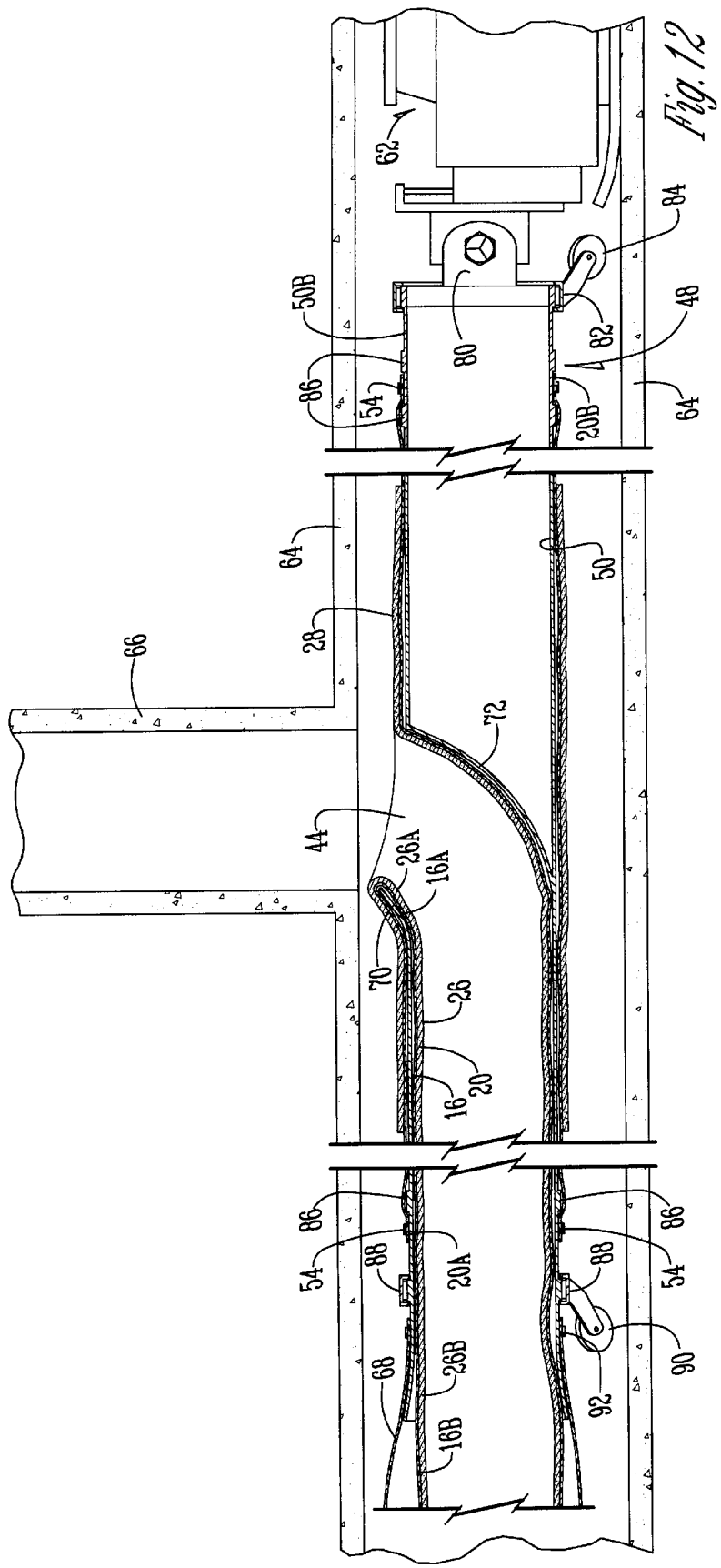

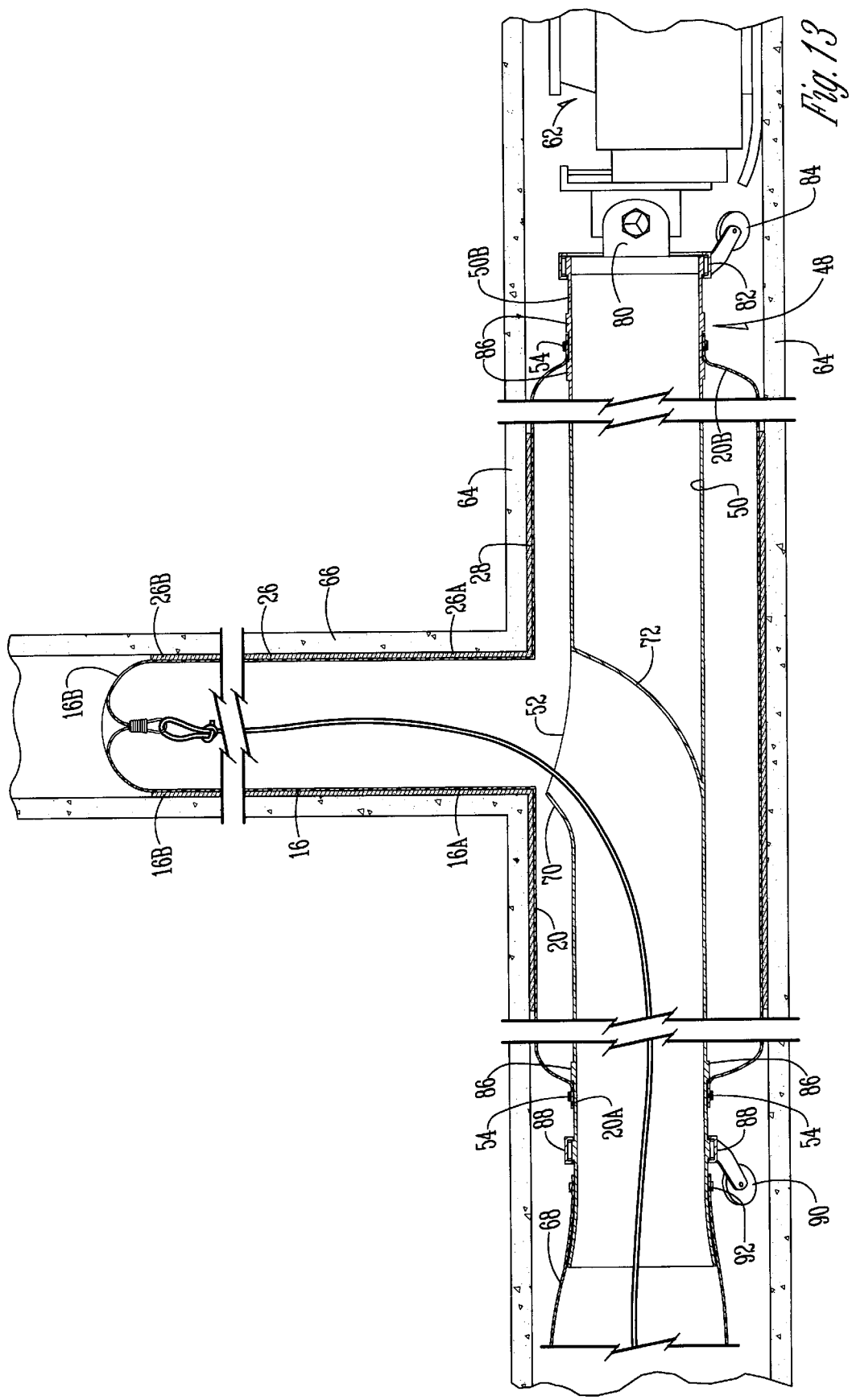

APPARATUS AND METHOD FOR REPAIRING THE JUNCTION OF A SEWER MAIN LINE AND LATERAL PIPE

TECHNICAL FIELD

The present invention relates generally to sewer pipe line repair, and more particularly to an improved method and apparatus for installing a resin impregnated liner at the juncture of a sewer main line and lateral pipe, and extending down the lateral pipe.

BACKGROUND OF THE INVENTION

One method of repairing damaged sewer pipe is to excavate the area surrounding the sewer pipe and replace the broken portion. This is a very expensive and labor intensive solution, and is also an inconvenience to residents living in the area and utilizing roadways overlying the area.

Another solution is to reline the sewer pipes on site. Such methods typically utilize a resin coated liner which is inserted into the existing sewer pipe line and fitted against the interior of the sewer pipe. The liner is held against the interior of the pipe while the resin cures to form a new pipe lining within the existing pipe.

One example of such a method is shown in U.S. Pat. No. 4,366,012. In this patent, a process utilizing an elongated bladder tube having an inner tubular liner comprised of felt is shown. Uncured resin is introduced into the bladder tube and is used to impregnate the felt inner liner. The bladder tube and the tubular liner are then inserted into the end of the sewer pipe to be repaired, and moved to the area of the sewer pipe needing repair. Upon reaching the area of the sewer pipe needing repair, the impregnated felt liner is inverted out of the bladder tube so that it is on the outside surface of the bladder tube and is pressed against the interior surface of the sewer pipe. When the resin cures, a new pipe liner is provided at the area to be repaired.

In many cases connection of lateral pipes to main sewer lines for residential or other customers was frequently accomplished by forming a hole in the main line with a sledge or the like. The lateral pipe was then simply abutted against the hole, and then the excavation back filled to cover the juncture. Often, this juncture of the lateral with the main line would leak, and would not provide a tight sealed connection.

With the growing concern regarding the environmental impact of sewage leakage, such junctures are primary concern for repair, and can be repaired simultaneously with the lining of the lateral pipe by the method of the present invention.

SUMMARY OF THE INVENTION

It is therefore a general object of the present invention to provide an improved method and apparatus for repairing the juncture of a main sewer line with a lateral pipe.

Another object is to provide a method and apparatus for repairing the juncture of a lateral with a main line which may be accomplished solely from the sewer main line.

Another object is to provide an improved seal at the juncture of the lateral pipe to the main sewer line.

Another object is to use a single piece T-shaped or Y-shaped liner at the junction between the main sewer line and the lateral pipe which provides a full circle seal around the interior of the main sewer line and around the interior of the lateral pipe.

These and other objects of the present invention will be apparent to those skilled in the art.

SUMMARY OF THE INVENTION

The foregoing objects may be achieved by an apparatus for repairing the junction of a sewer main line and a lateral pipe made according to the present invention. The apparatus comprises a bladder assembly having an elongated main bladder tube and an elongated lateral bladder tube. The main bladder tube includes first and second opposite ends and a main bladder tube opening positioned therebetween. The lateral bladder tube has a first end connected to the main bladder tube opening and has a second end.

The apparatus also includes a liner assembly formed of resin absorbent material and having a main liner tube and a lateral liner tube. The main liner tube includes a first end, a second end and a main liner tube opening intermediate the first and second ends. The lateral liner tube has a first lateral line tube end in communication with the main liner tube opening and is connected to the main liner tube and sealed around the main liner tube opening.

The lateral bladder tube and the lateral liner tube are positioned at least partially within the main bladder tube, with the main liner tube being outside of, and surrounding the main bladder tube and being connected to the lateral liner tube through the main bladder tube opening.

The lateral liner tube is invertible through the main bladder tube opening to an inverted position outside of the main bladder tube whereby the main liner tube is on the exterior of the main bladder tube and the lateral liner tube is on the exterior of the lateral bladder tube.

The present invention also contemplates a method for forming a lateral/bladder assembly comprising forming a bladder assembly having a main bladder tube and a lateral bladder tube. The main bladder tube includes first and second opposite ends and an intermediate opening therebetween. The lateral bladder tube has a first end connected to the intermediate opening of the main bladder tube and has a second end.

The method includes the step of inserting the lateral bladder tube inside the main bladder tube through the intermediate opening. Next, a liner assembly is formed of resin absorbent material and includes a lateral liner tube having a first and second end and a liner sheet having a sheet opening there in surrounding and attaching the first end of the lateral liner tube. The second end of the lateral liner tube is inserted into the intermediate opening of the bladder tube and is positioned at least partially inside the main bladder tube with the first end of the lateral liner tube being adjacent the intermediate opening of the main bladder tube, and with the liner sheet outside of the main bladder tube. The liner sheet is then formed into a main liner tube wrapped around and surrounding the main bladder tube adjacent the intermediate opening of the main bladder tube.

An important feature of the present invention is the T-shaped or Y-shaped liner assembly. This liner assembly is constructed from a resin absorbent material and comprises a main liner tube and a lateral liner tube formed into a T-shaped or Y-shaped configuration. The single piece liner assembly is impregnated with an uncured resinous material capable of curing and hardening. The liner assembly is then positioned within the sewer main line pipe in a position wherein the lateral liner tube extends within the lateral sewer pipe and the main liner tube is within the main line sewer pipe. The main liner tube and the lateral liner tube are then pressed radially outwardly against the interior surfaces of the main line sewer pipe and the lateral line sewer pipe respectively. The resin is permitted to cure and harden to form the liner assembly into a single piece whereby the main liner tube provides a full circle seal around the interior of the main sewer pipe on both sides of the damaged junction and the lateral liner tube provides a full circle seal around the interior of the lateral sewer pipe adjacent the damaged junction.

BRIEF DESCRIPTION OF THE DRAWINGS

FIG. 1 is an exploded perspective view showing the assembly of the bladder tube of the present invention;

FIG. 2 is a sectional view through the completed bladder tube shown in FIG. 1;

FIG. 3 is a perspective view of a liner assembly being constructed for the liner/bladder assembly of the present invention;

FIG. 4 is a sectional view similar to FIG. 2, but with the liner assembly installed in the bladder assembly, to form the liner/bladder assembly;

FIG. 5 is a pictorial view showing the introduction of uncured resin into the liner/bladder assembly;

FIG. 6 is an enlarged perspective view showing using a roller to facilitate impregnating the liner with the resin;

FIG. 7 is a pictorial view of the liner/bladder assembly being installed on a launcher;

FIG. 8 is a view similar to FIG. 7, showing a further step in connecting the liner/bladder assembly to the launcher;

FIG. 10 is a view similar to FIG. 9, showing a subsequent step in attaching the liner/bladder assembly to the launcher;

FIG. 11 is an enlarged perspective view of the launcher with the liner/bladder assembly attached thereto and ready for installation in a sewer line;

FIG. 12 is a sectional view through the liner/bladder assembly within a sewer line, showing the assembly position within a main line ready for expansion into a lateral pipe;

FIG. 13 is a sectional view similar to FIG. 12, but with the liner/bladder assembly expanded to install the liner.

DESCRIPTION OF THE PREFERRED EMBODIMENT

Figure 9:
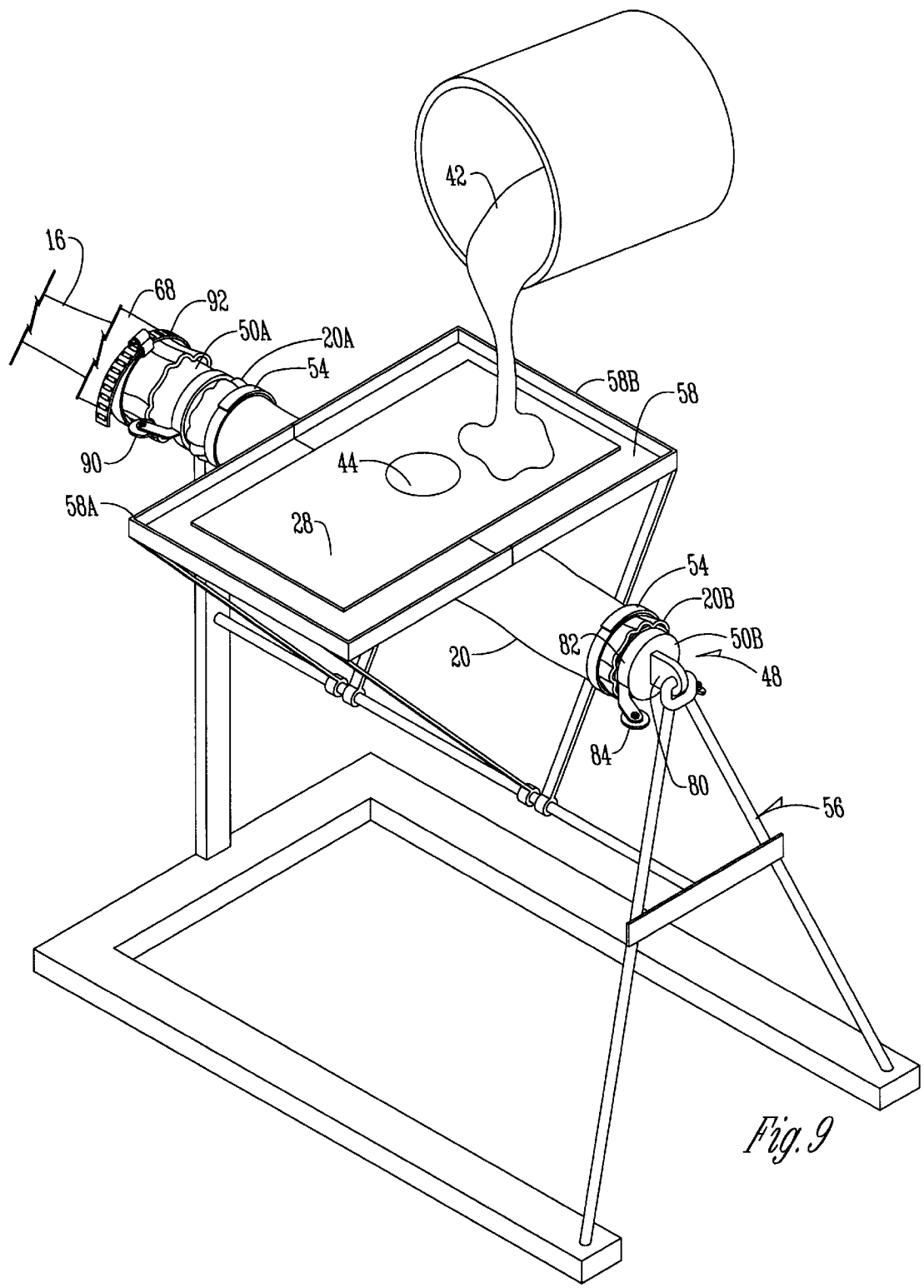
FIG. 9 is a pictorial view of the launcher with the liner/bladder assembly connected thereto, supported on a work platform.

Referring now to the drawings, in which similar or corresponding parts are identified with the same reference numeral, and more particularly to FIG. 1, the T-shaped bladder assembly is designated generally at 12 and forms a part of the liner/bladder assembly 10 shown in FIG. 4. While the bladder assembly 12 is shown to be T-shaped it may also be Y-shaped or otherwise shaped to accommodate the angle at which the main sewer pipe and lateral sewer pipe are disposed relative to one another. Bladder assembly 12 includes a flat sheet 14 of translucent urethane scrim material which is connected to a lateral bladder tube 16 also formed of translucent urethane scrim material. Lateral bladder tube 16 is an elongated member having first and second ends 16A and 16B respectively, with the first end 16A attached around an opening 18 located generally centrally in flat sheet 14. Preferably, lateral tube 16 is attached to sheet 14 by welding or the like to form an airtight seal at the juncture.

Flat sheet 14 is then formed into a tube and two longitudinal side edges 14A and 14B are welded together to form a main line bladder tube 20 (shown in broken lines in FIG. 1). Thus, main line bladder tube 20 and lateral bladder tube 16 form a T-shaped or Y-shaped bladder assembly 12 which is a single integral piece that is translucent.

Referring to FIG. 2, the second end 16B of lateral bladder tube 16 is inverted and drawn through the main line bladder tube 20 and out a first end 20A of the main line bladder tube 20, such that the first end 16A of the lateral bladder 16 is inverted to form an opening 22 in the side wall of main line bladder tube 20.

Referring now to FIG. 3, the liner assembly utilized in the liner/bladder assembly 10 shown in FIG. 4 is designated generally at 24. Liner assembly 24 includes a tubular lateral liner 26 connected to a flat sheet liner 28. Both liners 26 and 28 are formed of felt or other resin absorbent material. Lateral liner 26 is formed by connected side edges of a sheet of liner material with a polymer coating on one side, such that the polymer coating 30 is on the exterior of the tube being formed. The edges of the sheet are sewn together at a seam 32, and a strip of polymer tape 34 is welded over the seam to form an airtight seal.

Flat sheet liner 28 has a central opening formed therein, and has a polymer coating 36 on the top surface thereof. The lateral liner tube 26 is sewn to the flat sheet liner 28 around the opening, and a strip of polymer tape 38 is then welded continuously around the juncture to form an airtight seal.

Once liner assembly 24 has been completed, the second end 26B of the lateral liner 26 is inserted into the opening 22 in the side of main line bladder 20 and drawn into the lateral bladder 16 until the liner flat sheet 28 contacts the main line bladder 20. This step may be accomplished by attaching a rope (not shown) to end 26B of the lateral liner 26, and threading the rope through lateral bladder tube 16. Pulling the rope then causes the lateral liner 26 to move to the position shown in FIG. 4.

The second end 16B of the lateral bladder is closed off by inserting plug 15 which is held in place by a clamp 17. Extending through plug 15 are a PVC air pipe 21 and wick 40, as shown in FIGS. 4 and 5. Vacuum opening 19 is provided in the end 16B of bladder tube 16.

A quantity of curable resin 42 in liquid form is then introduced into the opening 44 of flat sheet liner 28 so as to continue into the lateral liner 26 within lateral bladder 16 (shown in FIG. 5). A vacuum source (not shown) is connected over the vacuum opening 19 to collapse the walls of the lateral bladder 16 and lateral liner 26 as shown in FIG. 6. The wick 40 will provide a path for evacuating gas from the lateral bladder 16 until the curable resin moves to the down stream end 16B of lateral liner 16 and completely impregnates the liner. Because the bladder assembly 12 is formed of a translucent material, it is possible to visually verify that the lateral liner 26 is completely impregnated with resin while inside the lateral bladder 16. A roller 46 is preferably utilized to move the slug of resin and assist in impregnating the liner 26 with the resin material.

Referring now to FIGS. 7 and 8, the liner/bladder assembly 10 is loaded into a launcher 48 for installation into a sewer pipe. Launcher 48 includes a hollow cylindrical tube 50 having forward and rearward ends 50A and 50B respectively. An aperture 52 is formed generally through the side wall of the launcher tube 50. The left hand edge of aperture 52 is provided with an upwardly extending flange 70 which facilitates the sliding of lateral bladder tube 16 into the launcher tube 50. The right side of the aperture 52 is provided with a downwardly curved wall 72 (FIG. 12).

Launcher 50 includes a clevis 80 mounted adjacent its rear end. Surrounding the rear end 50B of launcher 50 is a ring bearing 82, and mounted to ring bearing 82 are a pair of wheels 84 located at the 5 o'clock and 7 o'clock positions when viewed from an end view (not shown). The ring bearing 82 permits the wheels 84 to remain stationary while the entire body of the launcher 50 can be rotated about its longitudinal axis. Protruding outwardly from the surface of launcher tube 50 adjacent the rear end 50B are a pair of clamping ribs 86. Similarly a clamping rib 86 is provided adjacent the forward end 50A. A circular ring bearing 88 is also provided adjacent the forward end 50a and includes a pair of wheels 90 mounted thereon.

Liner/bladder assembly 10 is installed on the launcher 48 by inserting the second end 16B of lateral bladder 16 through aperture 52 and through launcher tube 50 and out the forward end 50A of the launcher tube 50. As the main line bladder tube 20 approaches the launcher 48, the rearward end 50B of the launcher tube 50 is inserted into the first end 20A of the main line bladder tube 20, as shown in FIG. 8. The flat sheet liner 28 is moved over the launcher side wall aperture 52, with the main line bladder 20 extending on opposite sides of aperture 58.

As shown in FIGS. 9–11, the ends 20A, 20B of the main line bladder tube 20 are attached to the forward and rearward ends 50A and 50B of launcher tube 50 by bands 54, and the launcher tube is connected to a support frame 56 which holds the launcher 48 in the air. A collapsible hose 68 is clamped to the forward end 50a of launcher tube 50 by means of a clamp 92.

A two piece platform 58 is pivoted up into position to support the flat sheet liner 28 above the launcher 48. As shown in FIG. 10, the two piece platform 58 includes two halves 58A and 58B with semicircular holes 60A and 60B which will form an aperture through which the lateral lining will extend when the platform is moved to the support position shown in FIG. 9.

Uncured resin 42 is then poured onto the flat sheet liner 28 and worked into the liner material. The two piece platform 58 is then separated and lowered, as shown in FIG. 10, and the flat sheet liner 28 is wrapped around the main line bladder 20, with one side edge 28A overlapping the other side edge 28B, as shown in FIG. 11. Side edges 28A and 28B are temporarily held tightly together with straps 60 of hook and loop fastener, tape, rubber bands, or other similar fasteners.

A positioning robot 62 is then attached to the rearward end 50b of launcher tube 50, as shown in FIG. 12 and is used to introduce the launcher 48 and liner/bladder assembly 10 into the sewer main line 64. Wheels 84, 90 facilitate movement of assembly 10 within the main sewer line 64. The lateral liner opening 44 is aligned with the lateral pipe 66 to be repaired. Bearings 82, 88 permit the robot 62 to rotate assembly 10 a full 360° so as to obtain alignment. Robot 62 also is capable of extending or retracting to move assembly 10 up to six inches for final exact alignment.

Once positioned, air pressure is applied within the launcher tube 50 via a "lay flat" tube 68 connected to the forward end 50a of launcher tube 50, to inflate the lateral bladder 16 and invert the lateral bladder upwardly into lateral pipe 66. The air pressure also presses the main liner 20 radially outwardly against main sewer line 64 and presses lateral liner 26 radially outwardly against lateral pipe 66 until the resin impregnated in the lateral liner 26 and main line liner 28 cures. Once cured, the generally T-shaped or Y-shaped liner assembly 24 is a one piece liner connecting the main pipe 64 with the lateral pipe 66 to seal them together. It provides full circle sealing of both the lateral pipe 66 and the main pipe 64. Because of the use of the polymer coated liner assembly 24, the actual liner assembly can be tested prior to installation in the ground, to ensure an airtight connection.

Whereas the invention has been shown and described in connection with the preferred embodiment thereof, many modifications, substitutions and additions may be made which are within the intended broad scope of the appended claims.

I claim:

1. A method for forming a liner/bladder assembly for repairing the junction of a main line pipe and a lateral pipe, said method comprising:

forming a main bladder tube and a lateral bladder tube, said main bladder tube having first and second opposite ends and an intermediate opening therebetween, said lateral bladder tube having a first end connected to said intermediate opening of said main bladder tube and having a second end;

inserting said lateral bladder tube inside said main bladder tube through said intermediate opening; forming a lateral liner tube and a liner sheet of resin absorbent material, said lateral liner tube having first and second ends, said liner sheet having a sheet opening therein surrounding and attached to said first end of said lateral liner tube;

inserting said second end of said lateral liner tube into said intermediate opening of said main bladder tube and positioning said lateral liner tube at least partially inside said main bladder tube with said first end of said lateral liner tube being adjacent said intermediate opening of said main bladder tube and with said liner sheet outside said main bladder tube;

forming said liner sheet into a main liner tube wrapped around and surrounding said main bladder tube adjacent said intermediate opening of said main bladder tube;

impregnating said main liner tube and said lateral liner tube with an uncured resinous material capable of curing in a predetermined length of time, said impregnating step being done after said inserting step.

2. A method according to claim 1 and further comprising impregnating said liner sheet with said uncured resinous material before said step of forming said liner sheet into a main liner tube.

3. A method according to claim 1 and further comprising taking a launcher tube having first and second opposite ends and a launcher tube opening therebetween, and positioning said main bladder tube in surrounding relation to said launcher tube with said launcher tube opening and said intermediate opening of said main bladder tube being in registered alignment and with said first and second ends of said launcher tube protruding outwardly from said first and second opposite ends of said main bladder tube.

4. A method according to claim 3 and further comprising attaching said first and second opposite ends of said main bladder tube in sealed engagement with the exterior of said launcher tube.

5. Apparatus for repairing the junction of a sewer main line and a lateral pipe connected thereto, comprising:

an elongated main bladder tube and an elongated lateral bladder tube, said main bladder tube having first and second opposite ends and a main bladder tube opening positioned there between, said lateral bladder tube having a first end connected to said main bladder tube opening;

a main liner tube and a lateral liner tube formed of resin absorbent material, said main liner tube having first and second opposite ends and a main liner tube opening there between, said lateral liner tube having a first lateral liner tube end connected to said main liner tube opening;

a launcher tube having first and second opposite ends and a launcher tube opening there between;

said main bladder tube being outside and surrounding said launcher tube and said lateral bladder tube extending through said launcher tube opening into the inside of said launcher tube;

said main liner tube being outside and surrounding said main bladder tube and said launcher tube, said lateral liner tube extending through said launcher tube opening into the inside of both said launcher tube and said lateral bladder tube;

said lateral bladder tube and said lateral liner tube being invertible through said launcher tube opening to an inverted position outside said launcher tube wherein said main liner tube and said lateral liner tube are on the exterior of said main bladder tube and said lateral bladder tube.

6. An apparatus according to claim 5 and further comprising said first and second opposite ends of said main bladder tube being attached to and sealed around the exterior of said launcher tube.

7. A method for repairing a damaged junction between a main line sewer pipe and a lateral sewer pipe, said method comprising:

forming a main bladder tube and a lateral bladder tube, said main bladder tube having first and second opposite ends and a main bladder tube opening there between, said lateral bladder tube having a first end connected to said main bladder tube opening;

forming a main liner member and a lateral liner tube of resin absorbent material, said main liner member having a main liner opening therein, said lateral liner tube having a first lateral liner tube end connected to said main liner opening;

inserting said lateral liner tube at least partially inside said lateral bladder tube while at the same time keeping said main liner member at least partially outside said main bladder tube;

inserting said lateral liner tube and said lateral bladder tube at least partially into the inside of a launcher tube through a launcher tube opening in said launcher tube while at the same time keeping said main bladder tube and said main liner member at least partially outside of said launcher tube.

8. A method according to claim 7 and further comprising inserting said launcher tube into said main line of said sewer, registering said launcher tube opening with said junction of sail lateral pipe and said main line pipe, and inverting said lateral bladder tube and said lateral liner tube out of said launcher tube into said lateral pipe with said lateral liner tube being outside said lateral bladder tube.

9. A method according to claim 8 and further comprising pressing said main liner tube radially outwardly against said main line pipe, permitting said curable resin to cure and harden, and removing said launcher tube, said main bladder tube, and said lateral bladder tube from said main line sewer pipe.

10. A method for repairing a damaged junction between a main line sewer pipe and a lateral sewer pipe, said method comprising:

constructing a single piece liner assembly from a resin absorbent material, said liner assembly comprising a main liner tube and a lateral liner tube, said main liner tube having first and second opposite ends and a main liner tube opening there between, said lateral liner tube having first and second ends, one of which is connected to said main liner tube opening of said main liner tube to provide communication from the interior of said lateral liner tube through said main liner tube opening to the interior of said main liner tube;

impregnating said main liner tube and said lateral liner tube with an uncured resinous material capable of curing and hardening;

mounting said liner assembly to a launcher tube having first and second opposite ends and a launcher tube opening positioned there between, said mounting step comprising placing said lateral liner tube within said launcher tube and placing said main liner tube on the exterior of said launcher tube, said lateral liner tube and said main liner tube being connected to one another through said launcher tube opening;

moving said launcher tube within said main line sewer pipe to a position wherein said launcher tube opening is in registered alignment with said damaged junction; and inverting said lateral liner tube out of said launcher tube through said launcher tube opening into said lateral sewer pipe;

pressing said main liner tube radially outwardly into engagement with the interior surface of said main line sewer pipe and said lateral liner tube radially outwardly into engagement with the interior surface of said lateral sewer pipe;

permitting said resin to cure and harden whereby said main liner tube provides a full circle seal around the interior of said main sewer pipe on both sides of said damaged junction, and said lateral liner tube provides a full circle seal around the interior of said lateral sewer pipe adjacent said damaged juncture.

11. A method according to claim 10 wherein a lateral bladder tube surrounds said liner tube within said launcher tube and a main line bladder tube surrounds said launcher tube, said inverting step further comprising inverting said bladder tube through said launcher tube opening into said lateral sewer pipe whereby said lateral liner tube is outside said lateral bladder tube and in engagement with the interior of said lateral sewer pipe.

12. A method according to claim 10 wherein said pressing step further comprises radially expanding a main bladder tube located between said main liner tube and the exterior of said launcher tube to press said main liner tube radially outwardly toward said main line sewer pipe.

13. A method according to claim 10 wherein said pressing step further comprises radially expanding a lateral bladder tube located inside said lateral liner tube to press said lateral liner tube radially outwardly toward said lateral sewer pipe.

* * * * *